(12) United States Patent
Nakamura et al.

(10) Patent No.: US 12,579,132 B2
(45) Date of Patent: Mar. 17, 2026

(54) COLLECTION DEVICE, COLLECTION METHOD, AND RECORDING MEDIUM

(71) Applicant: Rakuten Group, Inc., Tokyo (JP)

(72) Inventors: Tadashi Nakamura, Tokyo (JP); Anshul Mohil, Tokyo (JP); Alexey Besedin, Tokyo (JP); Josue Nzajyayo, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/899,197

(22) Filed: Sep. 27, 2024

(65) Prior Publication Data

US 2025/0110946 A1      Apr. 3, 2025

(30) Foreign Application Priority Data

Sep. 29, 2023      (JP) ................................. 2023-170755

(51) Int. Cl.
*G06F 16/23* (2019.01)
(52) U.S. Cl.
CPC ............................... *G06F 16/2379* (2019.01)
(58) Field of Classification Search
None
See application file for complete search history.

(56) References Cited

U.S. PATENT DOCUMENTS

| | | | |
|---|---|---|---|
| 12,003,426 B1* | 6/2024 | Gregg | H04L 47/781 |
| 2020/0005829 A1* | 1/2020 | Hasegawa | B60R 16/00 |
| 2021/0327550 A1* | 10/2021 | Sragow | G06F 16/355 |
| 2023/0088474 A1* | 3/2023 | Sragow | G16H 10/60 |
| | | | 705/2 |

FOREIGN PATENT DOCUMENTS

JP          2019-164425 A          9/2019

* cited by examiner

*Primary Examiner* — Richard L Bowen
(74) *Attorney, Agent, or Firm* — Sughrue Mion, PLLC

(57) ABSTRACT

A collection device includes a service record acquirer that acquires a service record from a service database related to a service to be processed; and a user record updater that updates, based on the acquired service record, the user record. Upon starting of updating processing for updating the user record, the user record updater aggregates a remaining work amount of the updating processing of services, among the plurality of services, for which the updating processing has already started but has not ended and, in updating processing based on the service record related to the service to be processed, determines, in accordance with the aggregated remaining work amount, whether to perform determination processing.

8 Claims, 12 Drawing Sheets

ACCESS LOG DATA OF SERVICE ID "A001"

| USER ID | ACCESS DATE AND TIME |
|---------|----------------------|
| X0001 | 2023/10/1  00:01:00 |
| X0100 | 2023/10/1  00:01:15 |
| Y0001 | 2023/10/1  00:02:30 |
| X0031 | 2023/10/1  00:03:00 |
| Y0013 | 2023/10/1  00:01:00 |
| | . . . |
| X0001 | 2023/10/15  13:01:00 |
| | . . . |

FIG.4

SERVICE DATABASE OF SERVICE ID"A001"

| USER ID | ACCESS COUNT |
|---------|--------------|
| X0001 | 20 |
| X0002 | 0 |
| | . |
| | . |
| | . |
| X0031 | 1 |
| | . |
| | . |
| | . |

FIG.5

USER DATABASE

| USER ID | SERVICE ID: A001 | SERVICE ID: A002 | · · · |
|---------|------------------|------------------|-------|
|         | ACCESS COUNT     | ACCESS COUNT     | · · · |
| X0001   | 20               | 2                | · · · |
| X0001   | 0                | 10               | · · · |
|         | · · ·            |                  |       |
| X0031   | 1                | 30               | · · · |
|         | · · ·            |                  |       |

FIG.8

USER DATABASE

| USER ID | SERVICE ID: A001<br>ACCESS COUNT | SERVICE ID: A002<br>ACCESS COUNT | . . . |
|---|---|---|---|
| X0001 | 10 | 5 | |
| . . . | . . . | | |
| X0032 | 5 | 30 | |
| . . . | . . . | | |
| : | | : | |

COMPARE

COMPARE

SERVICE DATABASE OF SERVICE ID " A001"

| USER ID | ACCESS COUNT |
|---|---|
| X0001 | 20 |
| . . . | . . . |
| X0032 | 5 |
| . . . | . . . |

FIG.11

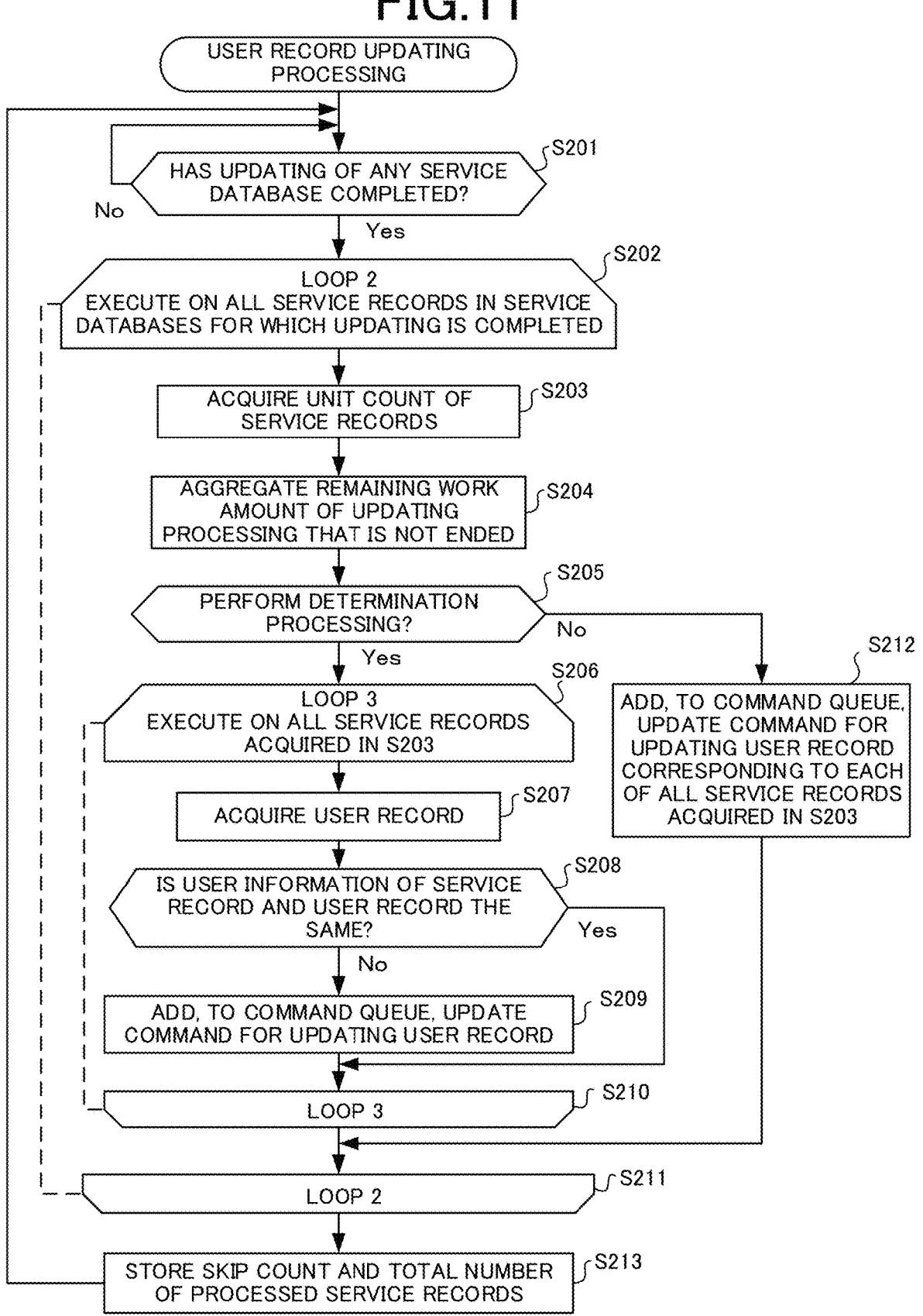

USER RECORD UPDATING PROCESSING

HAS UPDATING OF ANY SERVICE DATABASE COMPLETED?  S201

No

Yes

LOOP 2
EXECUTE ON ALL SERVICE RECORDS IN SERVICE DATABASES FOR WHICH UPDATING IS COMPLETED  S202

ACQUIRE UNIT COUNT OF SERVICE RECORDS  S203

AGGREGATE REMAINING WORK AMOUNT OF UPDATING PROCESSING THAT IS NOT ENDED  S204

PERFORM DETERMINATION PROCESSING?  S205

No

Yes

S212
ADD, TO COMMAND QUEUE, UPDATE COMMAND FOR UPDATING USER RECORD CORRESPONDING TO EACH OF ALL SERVICE RECORDS ACQUIRED IN S203

LOOP 3
EXECUTE ON ALL SERVICE RECORDS ACQUIRED IN S203  S206

ACQUIRE USER RECORD  S207

IS USER INFORMATION OF SERVICE RECORD AND USER RECORD THE SAME?  S208

Yes

No

ADD, TO COMMAND QUEUE, UPDATE COMMAND FOR UPDATING USER RECORD  S209

LOOP 3  S210

LOOP 2  S211

STORE SKIP COUNT AND TOTAL NUMBER OF PROCESSED SERVICE RECORDS  S213

COLLECTION DEVICE, COLLECTION METHOD, AND RECORDING MEDIUM

CROSS-REFERENCE TO RELATED APPLICATIONS

This application claims the benefit of Japanese Patent Application No. 2023-170755, filed on Sep. 29, 2023, the entire disclosure of which is incorporated by reference herein.

FIELD OF THE INVENTION

This application relates generally to a collection device, a collection method, and a recording medium.

BACKGROUND OF THE INVENTION

Technologies for collecting and accumulating information of users of services provided on the internet, and utilizing the accumulated information are known in the related art.

For example, Unexamined Japanese Patent Application Publication No. 2019-164425 describes an information processing device that collects, from a user terminal, viewing data of viewed content that has been viewed by a user, adds the collected viewing data for every user to a list to be stored in a database, and adds the viewing data to the database at a predetermined time interval.

SUMMARY OF THE INVENTION

This information processing device adds the collected viewing data of all of the users to the database and, as such, time is required from when the viewing data is collected to when added to the database. Consequently, there is room for improvement from the standpoint of efficiently carrying out processing for collecting information of users and accumulating the collected information of users in the database.

Additionally, in businesses that provide a plurality of services, the information of users to be collected becomes more voluminous and, as such, there is a need for a technology whereby it is possible to more efficiently carry out the processing for collecting the information of users and accumulating the collected information of users in the database.

The present disclosure is made with the view of the above situation, and an objective of the present disclosure is to provide a collection device, a collection method, and a recording medium whereby it is possible to efficiently carry out processing for collecting information of users of a plurality of services and accumulating the collected information of users in a database.

A collection device according to the present disclosure that solves the problem described above collects information of a user of a plurality of services and stores the collected information in a user database, the information of the user of each of the plurality of services being stored in a service record that each service database related to each of the services stores, information derived from the service record of each of the plurality of services being stored, for every user, in a user record of the user database, the collection device comprising: one or more processors, wherein the one or more processors acquires the service record from the service database related to a service to be processed, updates, based on the acquired service record related to the service to be processed, the user record, and upon starting of updating processing for updating the user record, aggregates a remaining work amount of the updating processing of services, among the plurality of services, for which the updating processing has already started but has not ended, and in the updating processing based on the service record related to the service to be processed, determines, in accordance with the aggregated remaining work amount, whether to perform determination processing for determining, for every user, whether updating for the user record is necessary and skipping the updating processing of a user for which updating is determined to be unnecessary.

According to the present disclosure, it is possible to provide a collection device, a collection method, and a recording medium whereby it is possible to efficiently carry out processing for collecting information of a user of a plurality of services and accumulating the collected information in a database.

BRIEF DESCRIPTION OF DRAWINGS

A more complete understanding of this application can be obtained when the following detailed description is considered in conjunction with the following drawings, in which:

FIG. 1 is an explanatory drawing illustrating the cooperation between a collection device and other devices;

FIG. 3 is a drawing illustrating an example of access log data;

FIG. 4 is a drawing illustrating an example of a service record generated by a service database;

FIG. 5 is a drawing illustrating an example of a user record stored in a user database;

FIG. 8 is a drawing explaining processing for comparing the service record and the user record by an update instructor;

FIG. 11 is a flowchart of another example of the user record updating processing.

DETAILED DESCRIPTION OF THE INVENTION

Figure 2:
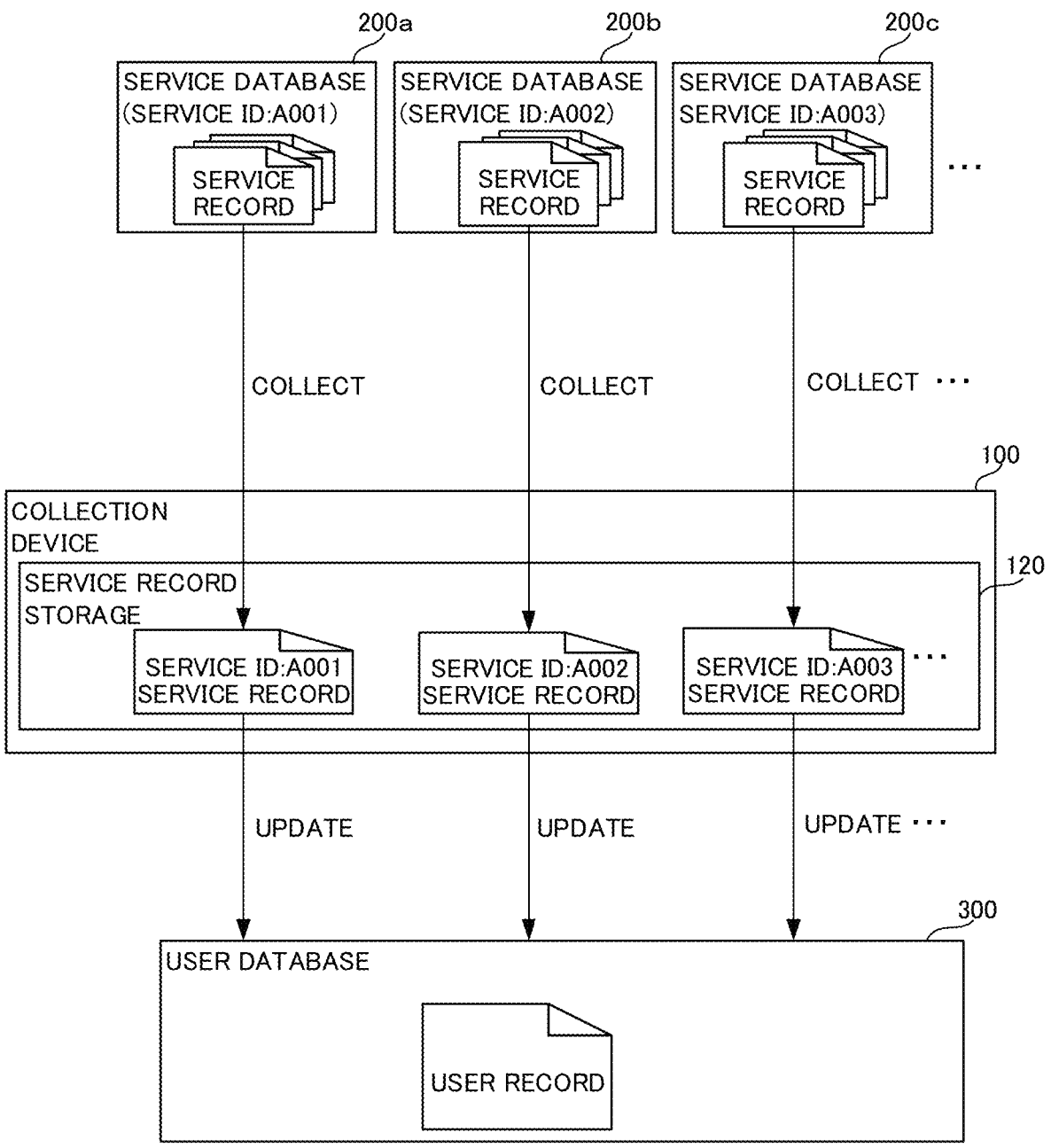
FIG. 2 is a drawing explaining processing executed by the collection device.

Hereinafter, embodiments of the present disclosure are described in detail while referencing the drawings. However, the following embodiments are presented for the purpose of explanation and should not be construed as limiting the scope of the invention of the present disclosure. Therefore, embodiments in which some elements or all elements of these embodiments are replaced with equivalent elements by one skilled in the art can also be employed, and such embodiments are also included within the scope of the present disclosure.

Relationship Between Collection Device and Program

A collection device according to the present embodiment collects, from a plurality of service databases that store user information including an access history of a user of services provided on the internet, the user information of each service. The collection device updates, on the basis of the collected user information, a user database that stores the user information, for every user of each of the plurality of services. Here, the user information is information expressing operations and attributes of each user. The collection device is constituted by one or a plurality of server devices (server computers).

Typically, the collection device according to the present embodiment is realized by causing a computer to execute a program, but the collection device can also be realized by a dedicated electronic circuit executing processes. In addition, as an intermediate form between a computer and a dedicated electronic circuit, the collection device of the present embodiment can be configured by compiling a program in the design script of an electronic circuit and applying a field programmable gate array (FPGA) or similar technology that dynamically configures the electronic circuit on the basis of that design script.

The collection device according to the present embodiment is realized by one or a plurality of server computers executing various functions that are realized by one or a plurality of server programs. The one or a plurality of server computers communicate with databases.

Typically, the programs executed by the server computers can be recorded on a non-transitory computer-readable information recording medium such as a compact disk, a flexible disk, a hard disk, a magneto-optical disk, a digital video disk, a magnetic tape, read-only memory (ROM), electrically erasable programmable ROM (EEPROM), flash memory, and semiconductor memory. This non-transitory information recording medium can be distributed/sold separate from the server computers.

In the server computers, a program stored on the non-transitory information recording medium such as a flash memory, a hard disk, or the like is read out to volatile memory such as random access memory (RAM), which is a temporary storage device, and, then, commands included in the read-out program are executed by a central processing unit (CPU). However, in architectures in which the ROM and the RAM can be mapped to a single memory space and execution is possible, the commands included in the programs stored in the ROM are read out and executed directly by the CPU.

Furthermore, the server program can be distributed/sold to the server computers, terminal computers, or the like from a distribution server or the like managed by the business, via a temporary transmission medium such as a computer communication network, separate from the computer on which the program is to be executed.

Note that, when the collection device is configured from a plurality of computers, the programs running on the various computers are a plurality of mutually different server programs that cooperate with each other while having mutually different functions. As such, the combination of this plurality of programs can be regarded as a system program for realizing the collection device.

Overall Configuration

Figure 1:
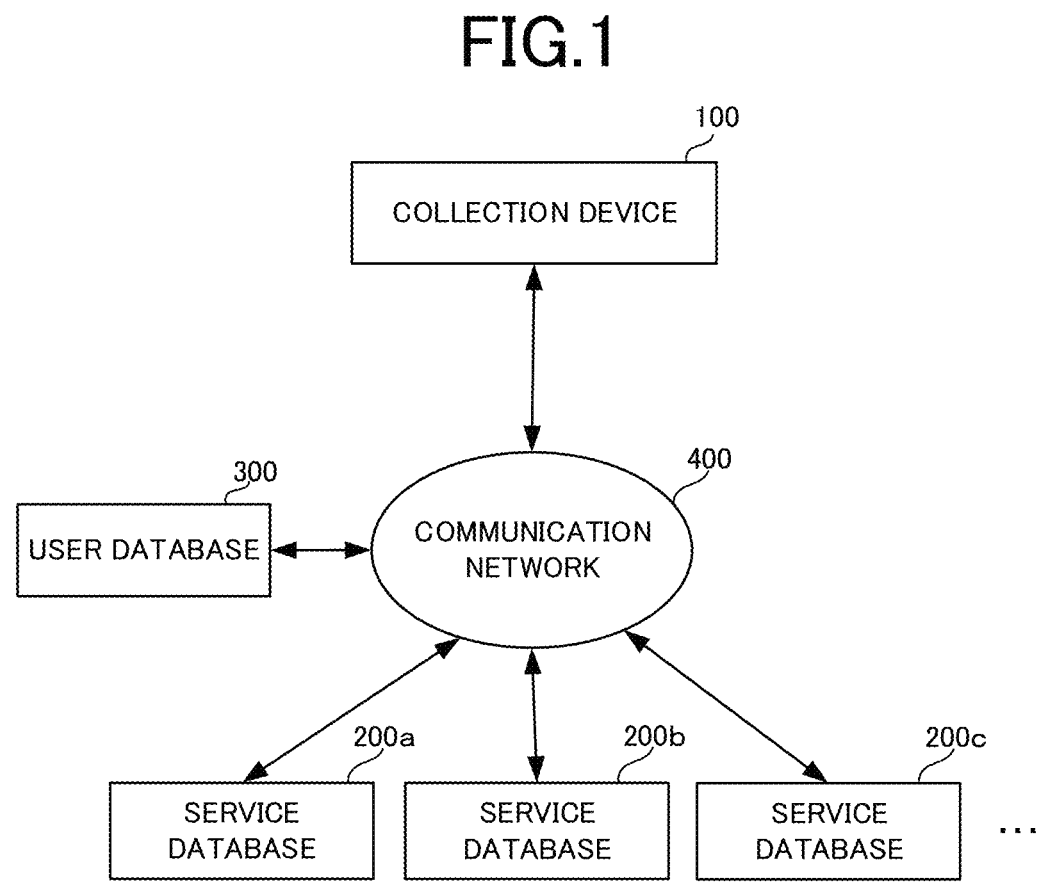

FIG. 1 is an explanatory drawing illustrating the cooperation between the collection device and other devices. Hereinafter, a description is given while referencing FIG. 1.

A collection device 100 is connected, via a communication network 400, to a plurality of service databases 200*a*, 200*b*, 200*c* . . . , and a user database 300. The communication network 400 can include various types of networks. Examples thereof include a local area network (LAN), a wide area network (WAN) such as the internet, a telecommunications network such as a public switched telephone network (PSTN), a wireless network, a public switched network, a satellite network, a cellular network, a public land mobile network (PLMN), a metropolitan area network (MAN), a private network, an ad-hoc network, an intranet, an optical fiber-based network, or any combination of these or other types of networks. Note that, in the following, the service databases 200*a*, 200*b*, 200*c* . . . may be collectively referred to as "service databases 200."

In one example, the collection device 100 is operated by a business or the like that operates a plurality of service providing sites on the internet. Here, an overview of the processing executed by the collection device 100 is described while referencing FIG. 2. As illustrated in FIG. 2, the collection device 100 collects, from the service databases 200*a*, 200*b*, 200*c* . . . , service records storing user information that includes an access history of each service providing site that the user has accessed using a user terminal. The collection device 100 updates, on the basis of the collected service records, a user record stored in a user database 300 that manages the user information by user and by service. Thus, information based on (derived from) the service records is stored in the user record.

When updating a user record, of a certain service, that is stored in the user database 300, the collection device 100 aggregates a remaining work amount of updating processing related to other services for which the updating processing has started but not ended. The collection device 100 compares, on the basis of the aggregated remaining work amount, the user record and the service record for every user, and determines whether to perform determination processing for determining whether updating is necessary. When a determination is made to perform the determination processing, the collection device 100 compares, for every user, the service records collected from the service databases 200 and the user record stored in the user database 300, and determines whether updating is necessary for every user. The collection device 100 skips the updating processing for the user record of users for which updating is determined to be unnecessary, and updates, using the collected service records, only the user records of the users for which updating is determined to be necessary. Meanwhile, when a determination is made to not perform the determination processing, the collection device 100 updates the user records corresponding to each of all of the service records collected from the service databases 200.

Returning to FIG. 1, the service databases 200 store service records that store, for every user, user information including an access history of each service providing site. The service databases 200 are realized by a storage device such as a hard disk drive (HDD), a solid state drive (SSD), or the like of service providing servers (not illustrated in the drawings) that provide each service. Each service providing server records access log data that is log data obtained when the user accesses each service providing site. FIG. 3 illustrates an example of the access log data of a service having a service ID of "A001". As illustrated in FIG. 3, the access log data includes information such as a "user ID" that is information that uniquely identifies the user, an "access date and time" expressing the date and time when the user accessed the service providing site, and the like. Note that the access log data is not limited to the example of FIG. 3, and may include any desired information. For example, a configuration is possible in which activity information such as a product purchase history, an earned points history, or the like is accumulated. Additionally, a configuration is possible in which log data is recorded that includes different information for every service.

The service databases 200 store aggregation results of aggregating the access log data for every desired aggregation period such as every day, every week, every month, or the like. FIG. 4 illustrates an example of a service database 200 of the service having the service ID of "A001". As illustrated in FIG. 4, the service databases 200 are tabular databases, and the service record of each row of the service databases 200 includes information such as the "user ID" that is information that uniquely identifies the user, an "access count" expressing the number of times that the user has accessed the service providing site in the aggregation period, and the like. Note that the information stored in the service record is not limited to the example of FIG. 4, and may include any desired information. For example, a configuration is possible in which information such as a service ID that uniquely identifies the service, a most recent access date and time in the aggregation period, a number of points earned by the user in the aggregation period, a number of products purchased by the user in the aggregation period, a purchase price, and the like is stored.

Returning to FIG. 1, the user database 300 stores the user record that stores the user information including the access history, for every user, of each of the plurality of services. The user database 300 is realized by a database server, a cloud server, or the like. FIG. 5 illustrates an example of the user database 300. As illustrated in FIG. 5, the user database 300 is a tabular database, and the user record of each row of the user database 300 includes information such as the "service ID" that is information that uniquely identifies the service, the "user ID" that is information that uniquely identifies the user, the "access count" expressing the number of accesses by the user in the aggregation period, and the like. Note that the information stored in the user record is not limited to the example of FIG. 5 and, as with the service databases 200, a configuration is possible in which information such as the most recent access date and time, the number of points earned, the number of products purchased, the purchase price, and the like is stored, and a name and address of the user, attribute information of the user, and the like may be stored.

Functional Configuration of Collection Device

Figure 6:
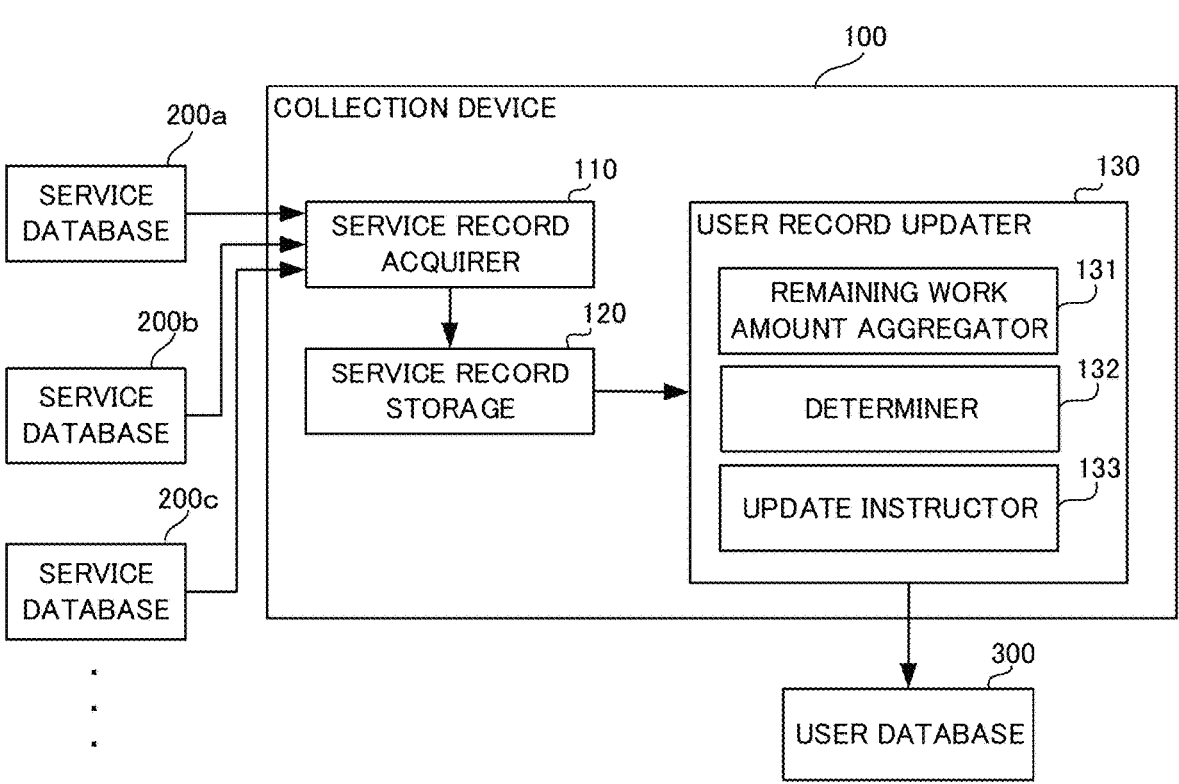
FIG. 6 is an explanatory drawing illustrating the functional configuration of the collection device.

Next, the functional configuration of the collection device 100 is described while referencing FIG. 6. The collection device 100 includes a service record acquirer 110, a service record storage 120, and a user record updater 130.

The service record acquirer 110 acquires the service records from the service databases 200a, 200b, 200c . . . . Specifically, the service record acquirer 110 intermittently, periodically, or when updating of a service record stored in each service database 200 is detected, acquires the service records from each of the service databases 200, and stores the acquired service records in the service record storage 120. The service record acquirer 110 may, in accordance with the number of the service records stored in the service databases 200, acquire all of the service records at one time, or 10 records at a time, 100 records at a time, or at any desired unit count.

Returning to FIG. 6, the service record storage 120 stores the service records acquired by the service record acquirer 110. Specifically, the service record storage 120 associates each of the acquired service records with the service ID for uniquely identifying the service database 200 that is the acquisition source of that service record, and stores the associated information. For example, as illustrated in FIG. 2, when a service record is acquired from the service database 200a, the service record storage 120 associates the acquired service record with the service ID "A001" of the service database 200a, and stores the associated information.

Returning to FIG. 6, the user record updater 130 includes a remaining work aggregator 131, a determiner 132, and an update instructor 133, and updates, on the basis of the service records acquired by the service record acquirer 110, the user record stored in the user database 300.

When starting processing for updating a user record, the remaining work aggregator 131 aggregates, on the basis of the service records of a given service, a remaining work amount. The remaining work amount is an amount of work of the updating processing that remains for services for which the updating processing has already started but has not ended. Specifically, the remaining work aggregator 131 aggregates, on the basis of update commands queued in a command queue storing update commands, the remaining work amount by a desired method such as aggregating a number of services for which the updating processing is not ended, aggregating a predicted amount of time to the completion of the updating processing that is not ended, aggregating a number of records for which the updating processing is not ended, aggregating a queue length that represents a number of update commands queued in the command queue, or the like. The processing of the remaining work aggregator 131 is described in detail later.

The determiner 132 compares, on the basis of the remaining work amount aggregated by the remaining work aggregator 131, the user record and the service records for every user, and determines whether to execute the determination processing for determining whether updating is necessary. Specifically, when, for example, the remaining work amount aggregated by the remaining work aggregator 131 is greater than or equal to a set threshold, the determiner 132 determines to execute the determination processing and, when less than the threshold, determines to not execute the determination processing. The determiner 132 notifies the update instructor 133 of the determination results.

Figure 7:
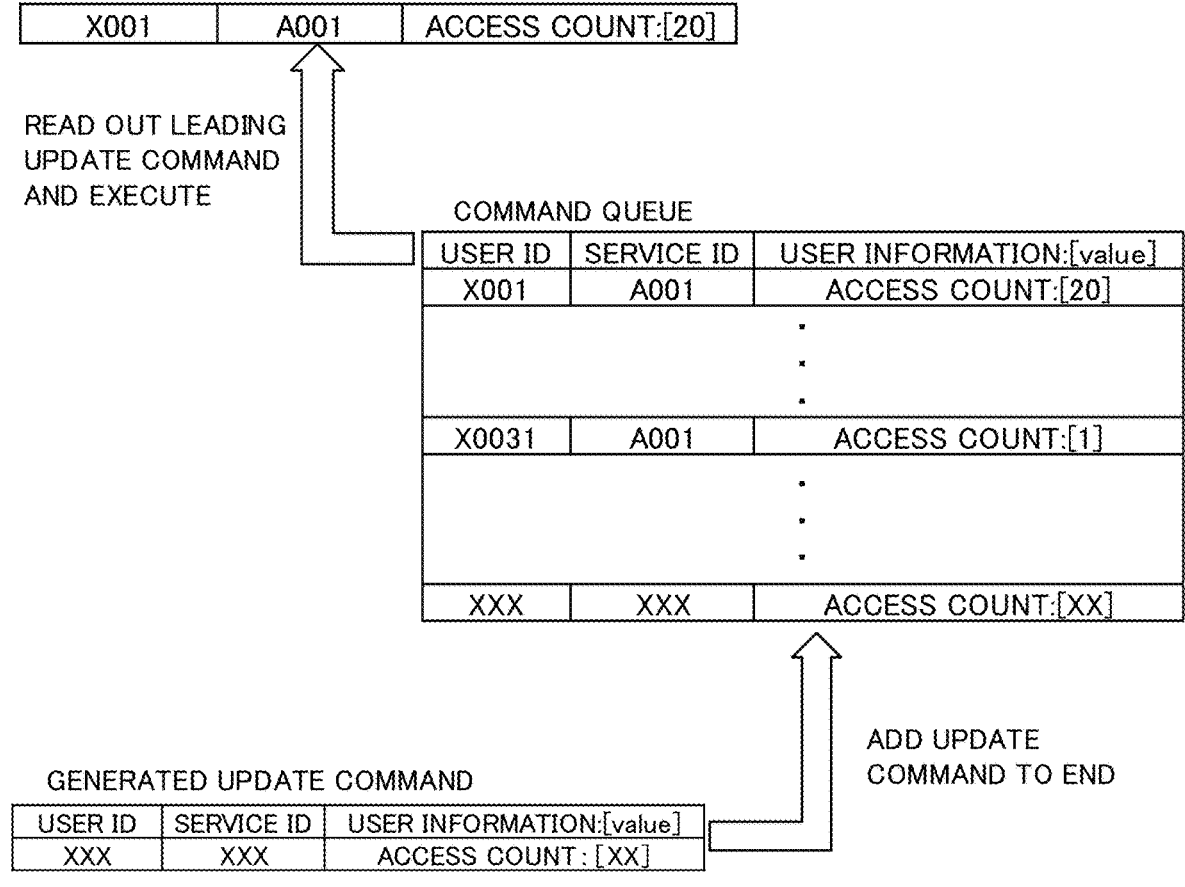
FIG. 7 is a drawing illustrating an example of a command queue of the collection device.

The update instructor 133 generates, on the basis of the determination results of the determiner 132, an update command for updating the user record, and adds the update command to the command queue that stores the update commands. In one example, the command queue holds the update commands in a first in first out (FIFO) list structure, and is constructed in the storage 14 of the collection device 100. As illustrated in FIG. 7, the command queue includes information such as the "user ID" for uniquely identifying the user, the "service ID" for uniquely identifying the service, a "user information: [value]" expressing identification information for uniquely identifying the user information to be updated and an updated value, and the like.

Specifically, when the determiner 132 notifies to execute the determination processing, the update instructor 133 accesses the user database 300 and reads out the most recent user record. Next, as illustrated in FIG. 8, the update instructor 133 compares, for every user, the service records and the user information of the user record. When the user information of the user record differs from the user information or the service records, the update instructor 133 determines that updating is necessary and, as illustrated in FIG. 7, generates an update command for updating the user record of that user and adds the generated update command to the end of the command queue. Meanwhile, when the user information of the user record and the user information of the service records are the same, the update instructor 133 determines that updating is unnecessary, and skips and does not generate the update command for updating the user record of that user. The user record updater 130 reads out the leading update command from the command queue and, then, executes the updating processing sequentially, in accordance with the update commands.

Meanwhile, when the determiner 132 notifies to not execute the determination processing, the update instructor 133 generates a number of update commands, corresponding to the number of records, for updating, by each of all of the service records acquired by the service record acquirer 110, the corresponding user records, and sequentially adds the generated update commands to the end of the command queue.

Physical Configuration of Collection Device

Figure 9:
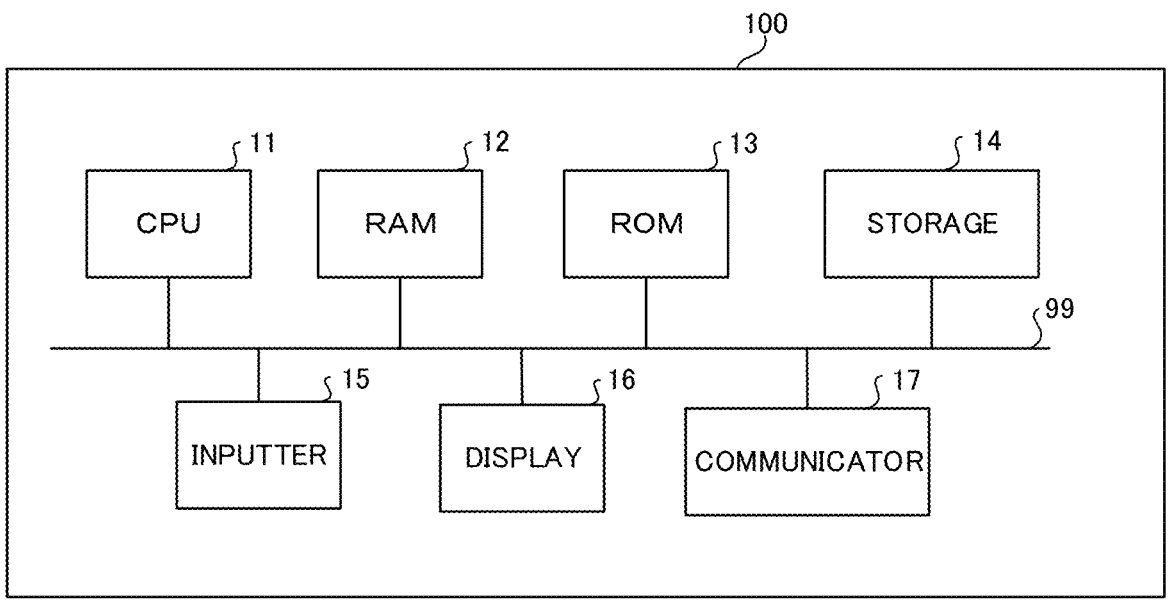
FIG. 9 is an explanatory drawing illustrating the physical configuration of the collection device.

As illustrated in FIG. 9, the collection device 100 having the functional configuration described above physically includes a CPU 11 that executes the processing according to the program, a RAM 12 that is volatile memory, a ROM 13 that is non-volatile memory, a storage 14 that stores data, an inputter 15 that receives inputs of information, a display 16 that visualizes and displays the information, and a communicator 17 that performs sending and receiving of the information. These constituents are connected via an internal bus 99.

The CPU 11 reads a program stored in the storage 14 out to the RAM 12 and executes that program to execute various processings. The CPU 11 executes, as the main functions provided by the program, the various processings of the service record acquirer 110 and the user record updater 130.

The RAM 12 is used as a working area of the CPU 11. The ROM 13 stores a control program, a basic input output system (BIOS), and the like that the CPU 11 executes for the basic operations of the collection device 100.

The storage 14 includes a hard disk drive, stores programs to be executed by the CPU 11, and stores various types of data to be used when executing the programs. The storage 14 functions as the service record storage 120.

The inputter 15 is implemented as a user interface such as a keyboard, a mouse, a communication device, or the like. The display 16 is implemented as a display device such as a liquid crystal display or an organic electro luminescence (EL) display that visualizes and displays information.

The communicator 17 is implemented as a network termination device or a wireless communication device that connects to a network, and a serial interface or LAN interface that connects to the network termination device or the wireless communication device.

User Record Updating Processing

Figure 10:
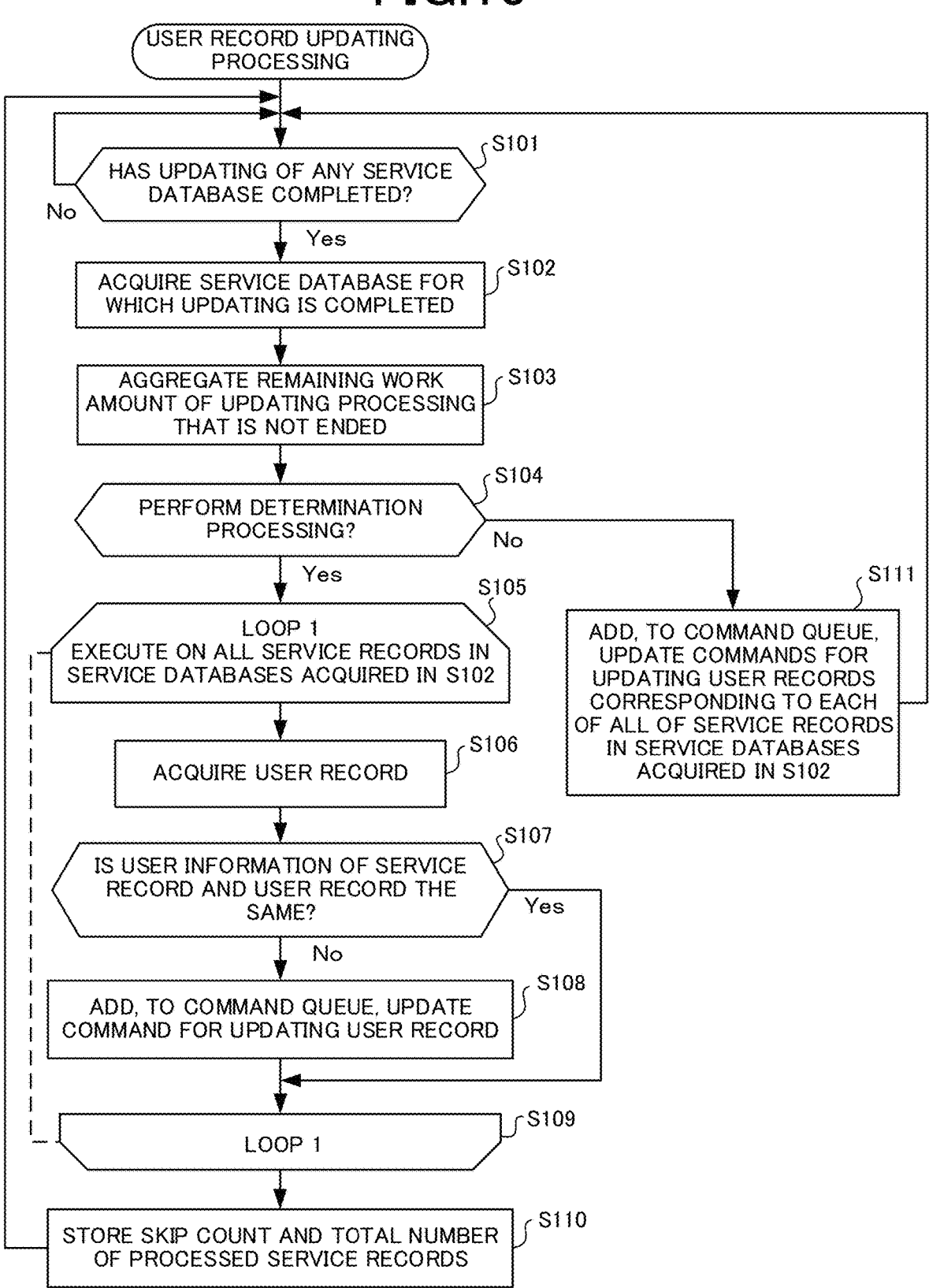
FIG. 10 is a flowchart of user record updating processing.

Next, the operations of the collection device 100 are described while referencing FIGS. 10 and 11. FIG. 10 is a flowchart that explains the flow of user record updating processing for acquiring, at one time, all of the service records from the service databases 200, and updating each of the corresponding user records. FIG. 11 is a flowchart that explains the flow of user record updating processing for sequentially acquiring the service records at a desired unit count from the service databases 200, and updating each of the corresponding user records. In one example, on the basis of settings by an administrator, the collection device 100 executes the user record updating processing according to the flowchart illustrated in FIG. 10 in service databases 200 that have a small data size, and executes the user record updating processing according to the flowchart illustrated in FIG. 11 in service databases 200 that have a large data size.

Firstly, the user record updating processing is described while referencing FIG. 10 for a case in which all of the service records are acquired at one time. The user record updating processing starts when, for example, the collection device 100 receives a command for starting the user record updating processing.

The service record acquirer 110 determines whether the updating of a service database 200 among the service databases 200*a*, 200*b*, 200*c* . . . has completed (step S101). Specifically, the service record acquirer 110 waits for a signal (hereinafter referred to as "update complete signal") notifying that the updating of a service database 200 has completed. The service record acquirer 110 detects, by the receiving of the update complete signal, that a service database 200 has been updated (step S101; Yes), and acquires the service database 200 for which the updating has been completed (step S102). The service record acquirer 110 stores the acquired service database 200 illustrated in FIG. 4 in the service record storage 120.

Meanwhile, when the update complete signal is not received, the service record acquirer 110 determines that none of the service databases 200 have been updated (step S101; No), executes step S101, and waits for the update complete signal. Note that a configuration is possible in which the service record acquirer 110 intermittently or periodically acquires the service databases 200*a*, 200*b*, 200*c* . . . , or compares an acquisition date and time of the previous acquisition and the update date and time of the service databases 200, and acquires the service databases 200 for which a determination of "has been updated" is made.

In step S102, when the service databases 200 are acquired, the remaining work aggregator 131 aggregates the remaining work amount of the updating processing that is not ended (step S103). Specifically, the remaining work aggregator 131 aggregates, on the basis of the update commands queued in the command queue illustrated in FIG. 7, the remaining work amount by calculating the number of services for which the updating processing is not ended, the predicted amount of time to the ending of the updating processing that is not ended, the number of records for which the updating processing is not ended, the queue length that represents the number of update commands queued in the command queue, or the like.

When calculating the number of services for which the updating processing is not ended, the remaining work aggregator 131 calculates the number of service IDs included in the command queue. When calculating the predicted amount of time to the ending of the updating processing that is not ended, the remaining work aggregator 131 calculates the predicted amount of time by multiplying the amount of time required to execute updating processing based on one update command by the number of update commands queued in the command queue. When calculating the number of records for which the updating processing is not ended, the remaining work aggregator 131 calculates a number of combinations of the service IDs and the user IDs included in the command queue. When calculating the queue length, the remaining work aggregator 131 calculates the number of update commands queued in the command queue.

Next, the determiner 132 compares, on the basis of the aggregation results of the remaining work aggregator 131 obtained in step S103, the user record and the service records for every user, and determines whether to execute the determination processing for determining whether updating is necessary (step S104). Specifically, when the remaining work amount aggregated by the remaining work aggregator 131 exceeds a set threshold, the determiner 132 determines to execute the determination processing and, when less than or equal to the threshold, determines to not execute the determination processing. The determiner 132 notifies the update instructor 133 of the determination results.

When the determiner 132 determines to execute the determination processing (step S104; Yes), the update instructor 133 repeatedly executes the processing of steps S106 to S108 on all of the service records in the service databases 200 acquired in step S102 (step S105).

In step S106, the update instructor 133 reads out an unprocessed service record, and acquires, from the user database 300, the user record corresponding to the read-out service record (step S106). Specifically, the update instructor 133 acquires the service ID associated with the read-out service record, and the user record that matches the user ID stored in the read-out service record.

Next, in step S107, the update instructor 133 compares the user information of the user record and the service record, and determines whether the user information is the same (step S107). As illustrated in FIG. 8, for example, when comparing, for the user ID "X0001", the user record and the service record of the service ID "A001", the access count "20" of the user ID "X0001" stored in the service record, and the access count "10" of the user ID "X0001" stored in the user record are compared. When the user information of the user record differs from the user information of the service record (step S107; No), the update instructor 133 determines that updating is necessary, generates an update command for updating the user record of that user, and adds the generated update command to the end of the command queue (step S108). Specifically, in the case of the user ID "X0001" described above, a command for updating the access count "10" of the service ID "A001" of the user record to the access count "20" of the service record is generated and added to the end of the command queue.

Meanwhile, when the user information of the user record is the same as the user information of the service record (step S107; Yes), the update instructor 133 determines that updating is unnecessary, and skips and does not generate an update command for updating the user record of that user.

Returning to FIG. 10, in step S109, the update instructor 133 determines whether the processing of loop 1 has been executed for all of the service records included in the service databases 200 acquired in step S102 (step S109). When a determination is made that there is an unprocessed service record, the update instructor 133 executes the processing of loop 1 for that unprocessed service record. The update instructor 133 generates update commands for updating the user records for which updating is determined to be necessary, and sequentially adds the generated update commands to the end of the command queue.

Meanwhile, when, in step S109, the update instructor 133 determines that the processing of loop 1 has been executed for all of the users, step S110 is executed. The update instructor 133 stores, in the storage 14, a total number of the service records processed in the loop processing of loop 1, that is, the number of records included in the service records acquired in step S102 and a skip count that is the number of users for which the generation of the update command is skipped in step S107 (step S110), and executes step S101.

Returning to step S104, when the determiner 132 determines to not execute the determination processing (step S104, No), the update instructor 133 generates a number of update commands, corresponding to the number of all of the users, for updating, by the service records of all of the users included in the service records acquired by the service record acquirer 110, the user record of each of the users, and sequentially adds the generated update commands to the end of the command queue (step S111). When the adding of the update commands of all of the users to the command queue is finished, the update instructor 133 executes step S101.

The user record updater 130 reads out, starting with the leading update command, the update commands added by the update instructor 133, and sequentially updates the user records.

Figure 12:
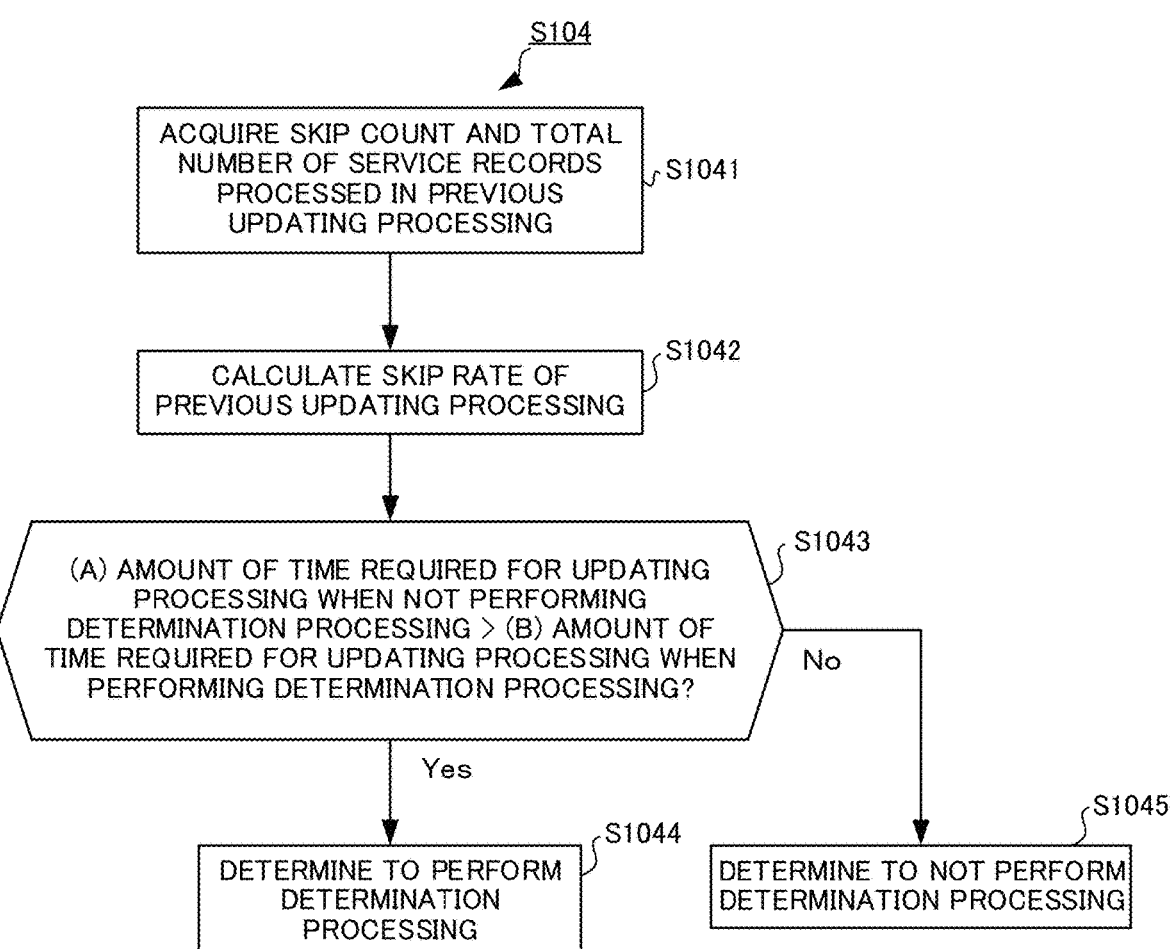
FIG. 12 is a flowchart of step S104 in a subsequent updating processing.

Note that, in the subsequent updating processing, in step S104, the determiner 132 may determine whether to execute the determination processing by comparing (A) the amount of time required for the updating processing when not performing the determination processing and (B) the amount of time required for the updating processing when performing the determination processing, on the basis of a skip rate calculated from the skip count and the total number of service records stored in step S110 of the previous updating processing. The amount of time of (A) is the amount of time required for updating processing based on all service records to be processed, and the amount of time of (B) is the sum total of the amount of time required for the determination processing for all service records to be processed and the amount of time required for updating processing based on only the service records for which updating is determined to be necessary. Details of the processing of step S104 in this case are described below while referencing FIG. 12.

Firstly, the determiner 132 acquires, from the storage 14, the skip count and the total number of service records processed in the previous updating processing (step S1041). Next, the determiner 132 calculates the skip rate that is a ratio of the skip count to the total number of service records (step S1042).

Next, on the basis of the skip rate calculated in step S1042, the determiner 132 uses the following Equations (1) and (2) to calculate each of (A) the amount of time required for the updating processing when not performing the determination processing, and (B) the amount of time required for the updating processing when performing the determination processing, and determines whether the amount of time (B) is less than the amount of time (A) (step S1043).

$$\text{Amount of time required for updating processing when not performing determination processing} = (\text{number of all service records to be processed}) \times (\text{amount of time required for updating processing per one service record}) \quad \text{Eq. (1)}$$

$$\text{Amount of time required for updating processing when performing determination processing} = ((\text{number of all service records to be processed}) \times (\text{amount of time required for determination processing for one service record})) + (\text{number of all service records to be processed}) \times (1 - \text{skip rate}) \times (\text{amount of time required for updating processing per one service record}) \quad \text{Eq. (2)}$$

Note that, in Equations (1) and (2) above, the amount of time required for the updating processing per one service record is, for example, the amount of time required for the processing to generate an update command based on one service record, and the amount of time required for the determination processing for one service record is the amount of time required for the processing to, for one service record, read out the user record and compare the service record and the user record. For example, a configuration is possible in which, in a preparation stage before operating the collection device 100, each of the amount of time required to generate an update command based on one service record and the amount of time required for the determination processing for one service record is measured, and these amounts of time are set using the measured values. Additionally, a configuration is possible in which, after step S110 or step S111, an operation log of the collection device 100 is confirmed and each amount of time is calculated and stored and, at a time of the subsequent determination processing, the amount of time (A) and the amount of time (B) are calculated using the stored amount of time required for the processing for generating an update command based on one service record and the stored amount of time required for the determination processing for one service record. Moreover, a configuration is possible in which a maximum likelihood estimation method or the like is used to calculate an estimated value from each of the amount of time required for the processing for generating an update command based on one service record and the amount of time required for the determination processing for one service record, calculated using the operation logs of the collection device 100 of a plurality of past instances, and the calculated estimated values are used to calculate the amount of time (A) and the amount of time (B).

Note that a configuration is possible in which, in step S1043, a determination is made whether the skip rate calculated in step S1042 is greater than a threshold. Here, the threshold may be set to any value such as 80%, 90%, or the like. Additionally, for example, a configuration is possible in which a smallest skip rate that satisfies (A) amount of time required for updating processing
  when not performing determination processing>
  (B) amount of time required for updating pro-
  cessing when performing determination process-
  ing is set as the threshold on the basis of Equation (3) below.

(number of all service records to be processed)×
  (amount of time required for updating process-
  ing per one service record)>((number of all ser-
  vice records to be processed)×(amount of time
  required for determination processing for one
  service record))+(number of all service records
  to be processed)×(1−skip rate)×(amount of time
  required for updating processing per one service
  record)                                          Eq. (3)

When a determination is made that (B) the amount of time required for the updating processing when performing the determination processing is less than (A) the amount of time required for the updating processing when not performing the determination processing (step S1043; Yes), the determiner 132 determines to perform the determination processing (step S1044); and when a determination is made that (B) the amount of time required for the updating processing when performing the determination processing is greater than or equal to (A) the amount of time required for the updating processing when not performing the determination processing (step S1043; No), the determiner 132 determines to not perform the determination processing (step S1045).

Next, the user record updating processing is described while referencing FIG. 11 for a case in which the service records are acquired in a unit count. Note that steps are included that are the same as in the flowchart illustrated in FIG. 10 and, as such, the following description will focus on the differences.

As in the processing of step S101, in step S201, a determination is made whether updating of any of the service databases 200 among the service databases 200a, 200b, 200c . . . has been completed (step S201).

Next, in step S202, the user record updater 130 repeatedly executes the processing of steps S203 to S212 on all of the service records in the service databases 200 for which it is determined in step S201 that updating has been completed (step S202).

In step S203, the service record acquirer 110 acquires, by a unit count, the unprocessed service records from the service databases 200 (step S203).

Next, the collection device 100 executes, for every unit count of service records acquired in step S203, steps S204 to S210 that are the same as steps S103 to S109. In step S210, the update instructor 133 determines whether the processing of loop 3 has been executed for all of the service records acquired in step S203, and repeatedly executes the processing of loop 3 until a determination is made that the processing of loop 3 has been executed for all of the service records.

Next, in step S211, the user record updater 130 determines whether the processing of loop 2 has been executed for all of the service records in the service databases 200 for which it is determined in step S201 that updating has been completed, and repeatedly executes the processing of loop 2 until a determination is made that the processing of loop 2 has been executed for all of the service records.

Next, by the same processing as step S110, the update instructor 133 stores, in the storage 14, the total number of the service records processed in the processing of loop 2 and the skip count that is the number of records for which a determination is made to skip the generation of the update command (step S213), and executes step S201.

Thus, when starting the updating processing for updating the user record, the collection device 100 aggregates the work amount of the unprocessed updating processing stored in the command queue and, on the basis of the aggregation results, determines, for every user, whether to execute the determination processing for determining whether updating is necessary. When the work amount of the unprocessed updating processing is great, the collection device 100 determines to execute the determination processing, skips and does not generate an update command for the users for which updating is unnecessary, and generates and adds, to the command queue, only update commands of users for which updating is necessary. Meanwhile, when the work amount of the unprocessed updating processing is small, the collection device 100 determines to not perform the determination processing, and generates and adds, to the command queue, update commands of the user records corresponding to each of all of the service records. Accordingly, in accordance with work amount of the updating processing that has started but has not ended at the time of the start of the updating processing of a given service, a determination is made whether to generate update commands of the user records corresponding to each of all of the service records, or to generate update commands of only the user records corresponding to the service records for which updating is necessary. As such, it is possible to efficiently execute processing for collecting and accumulating, in a database, information of users of a plurality of services.

Modified Examples

In the embodiments described above, a description is given in which the service databases 200 are constructed in service providing servers that provide various services, but the present disclosure is not limited thereto, and the service databases 200 may be constructed as an external database server, a cloud server, or the like that can be accessed via a network and the service providing server.

In the embodiments described above, a description is given in which the user database 300 is realized by a database server, a cloud server, or the like, but a configuration is possible in which the user database 300 is realized by the storage 14 of the collection device 100.

In the embodiments described above, a description is given in which the collection device 100 includes a single command queue, reads out the update commands from the single command queue, and executes the updating processing. However, a configuration is possible in which the collection device 100 includes a plurality of command queues, reads out the update commands from each of the command queues, and executes a plurality of updating processings in parallel. In such a case, it is sufficient to set the correspondence of the service for every command queue, and that the update commands of each service are added to each command queue on the basis of the set correspondences.

A configuration is possible in which the program to be executed by the collection device 100 and the like is stored and distributed on a non-transitory computer-readable medium such as a compact disc read-only memory (CD-ROM), a digital versatile disc (DVD), a magneto-optical disc (MO), a USB memory, a memory card, or the like. Moreover, by installing that program on a specific or general-use computer, that computer can be made to function as the collection device 100 of the embodiments described above.

A configuration is possible in which the program is stored on a disc device of a server device installed on communication network such as the internet, and downloaded to the computer by being superimposed on a carrier wave, for example. The processing described above can also be achieved by starting up and executing the program while transferring the program via the communication network. Furthermore, the processing described above can also be achieved by causing a portion or the entirety of the program to be executed on the server device, and executing the program while the computer sends and receives information related to the processing of the program via the communication network.

Note that, in cases in which the functions described above are realized in part by an operating system (OS), or the functions are realized by cooperation between an OS and an application, it is possible to store and distribute only the portion other than the OS on the non-transitory computer readable medium, or download the portion other than the OS to the computer.

Hereinafter, various aspects of the present disclosure are recited as appendices.

APPENDIX 1

A collection device that collects information of a user of a plurality of services and stores the collected information in a user database, the information of the user of each of the plurality of services being stored in a service record that each service database related to each of the services stores, information derived from the service record of each of the plurality of services being stored, for every user, in a user record of the user database, the collection device comprising: one or more processors, wherein the one or more processors acquires the service record from the service database related to a service to be processed, updates, based on the acquired service record related to the service to be processed, the user record, and upon starting of updating processing for updating the user record, aggregates a remaining work amount of the updating processing of services, among the plurality of services, for which the updating processing has already started but has not ended, and in the updating processing based on the service record related to the service to be processed, determines, in accordance with the aggregated remaining work amount, whether to perform determination processing for determining, for every user, whether updating for the user record is necessary and skipping the updating processing of a user for which updating is determined to be unnecessary.

APPENDIX 2

The collection device according to appendix 1, wherein the one or more processors starts the updating processing by adding, to a command queue, an update command for updating, based on the acquired service record, the user record for every user.

APPENDIX 3

The collection device according to appendix 2, wherein the one or more processors aggregates, based on the command queue in which the update command is accumulated, at least one of a number of the services for which the updating processing is not ended, a predicted amount of time required for the updating processing that is not ended, a number of user records for which the updating processing is not ended, and a length of the command queue, and determines, based on aggregation results, whether to perform the determination processing.

APPENDIX 4

The collection device according to any one of appendices 1 to 3, wherein
the one or more processors
in a case in which a determination to perform the determination processing is made,
acquires, from the user database, a user record associated with the acquired service record, and determines, for every user, whether updating of the user record is necessary by comparing, for every user, the service record and the user record.

APPENDIX 5

The collection device according to any one of appendices 1 to 4, wherein
the one or more processors
in a case in which a determination to perform the determination processing is made and the determination processing is executed,
records a total number of the acquired service record and a skip count of the service record skipped due to the determination processing, and
in the updating processing of a subsequent service to be processed, calculates a skip rate expressing a ratio of the skip count to the recorded total number of the service record, and determines, in accordance with the calculated skip rate, whether to perform the determination processing.

APPENDIX 6

The collection device according to appendix 5, wherein the one or more processors
based on the calculated skip rate,
calculates an amount of time (A) required for the updating processing based on all of the service records to be processed, and an amount of time (B) required to perform the determination processing for all of the service records to be processed and perform the updating processing based on only the service record for which updating is determined to be necessary, and determines to perform the determination processing in cases in which a determination is made that the amount of time (A) is less than the amount of time (B).

APPENDIX 7

The collection device according to any one of appendices 1 to 6, wherein
the one or more processors
in a case in which a determination to not perform the determination processing is made,
updates, based on the service record of all users included in the acquired service record, the user record.

APPENDIX 8

A collection method comprising:
by a computer, that is a collection device that collects information of a user of a plurality of services and stores the collected information in a user database,
acquiring, from a service database related to a service to be processed, a service record storing the information of the user of each of the plurality of services;
updating, based on the acquired service record related to the service to be processed, a user record that is stored in the user database and in which information derived from the service record of each of the plurality of services is stored for every user; and
upon starting of the updating the user record,
aggregating a remaining work amount of the updating of services, among the plurality of services, for which the updating has already started but has not ended, and
in the updating based on the service record related to the service to be processed, determining, in accordance with the aggregated remaining work amount, whether to perform determination processing for determining, for every user, whether updating for the user record is necessary and skipping the updating of a user for which updating is determined to be unnecessary.

APPENDIX 9

A non-transitory computer-readable recording medium storing a program for causing a computer, that is a collection device that collects information of a user of a plurality of services and stores the collected information in a user database, to execute processing of:

acquiring, from a service database related to a service to be processed, a service record storing the information of the user of each of the plurality of services;
updating, based on the acquired service record related to the service to be processed, a user record that is stored in the user database and in which information derived from the service record of each of the plurality of services is stored for every user; and
upon starting of updating processing for updating the user record,
aggregating a remaining work amount of the updating processing of services, among the plurality of services, for which the updating processing has already started but has not ended, and
in the updating processing based on the service record related to the service to be processed, determining, in accordance with the aggregated remaining work amount, whether to perform determination processing for determining, for every user, whether updating for the user record is necessary and skipping the updating processing of a user for which updating is determined to be unnecessary.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure can be suitably used for a collection device, a collection method, and a recording medium that collect information of users of a plurality of services and accumulate the collected information of users in a database.

The invention claimed is:
1. A collection device that collects information of a user of a plurality of services and stores the collected information in a user database,
the information of the user of each of the plurality of services being stored in a service record that each service database related to each of the services stores,
information derived from the service record of each of the plurality of services being stored, for every user, in a user record of the user database,
the collection device comprising: one or more processors, wherein
the one or more processors
acquires the service record from the service database related to a service to be processed,
updates, based on the acquired service record related to the service to be processed, the user record, wherein the one or more processors starts the updating processing by adding, to a command queue, an update command for updating, based on the acquired service record, the user record for every user; and
wherein updating the user record comprises, for only user records having an associated update command in the command queue, editing content of the user record, and storing the updated user record in the user database, and
upon starting of updating processing for updating the user record,
aggregates a remaining work amount of the updating processing of services, among the plurality of services, for which the updating processing has already started but has not ended, and in the updating processing based on the service record related to the service to be processed, determines, in accordance with the aggregated remaining work amount, whether to perform determination processing for determining, for every user, whether updating for the user record is necessary and skipping the updating processing of a user for which updating is determined to be unnecessary.

2. The collection device according to claim 1, wherein the one or more processors aggregates, based on the command queue in which the update command is accumulated, at least one of a number of the services for which the updating processing is not ended, a predicted amount of time required for the updating processing that is not ended, a number of user records for which the updating processing is not ended, and a length of the command queue, and determines, based on aggregation results, whether to perform the determination processing.

3. The collection device according to claim 1, wherein the one or more processors in a case in which a determination to perform the determination processing is made, acquires, from the user database, a user record associated with the acquired service record, and determines, for every user, whether updating of the user record is necessary by comparing, for every user, the service record and the user record.

4. The collection device according to claim 1, wherein the one or more processors in a case in which a determination to perform the determination processing is made and the determination processing is executed, records a total number of the acquired service record and a skip count of the service record skipped due to the determination processing, and in the updating processing of a subsequent service to be processed, calculates a skip rate expressing a ratio of the skip count to the recorded total number of the service record, and determines, in accordance with the calculated skip rate, whether to perform the determination processing.

5. The collection device according to claim 4, wherein the one or more processors based on the calculated skip rate, calculates an amount of time (A) required for the updating processing based on all of the service records to be processed, and an amount of time (B) required to perform the determination processing for all of the service records to be processed and perform the updating processing based on only the service record for which updating is determined to be necessary, and determines to perform the determination processing in cases in which a determination is made that the amount of time (A) is less than the amount of time (B).

6. The collection device according to claim 1, wherein the one or more processors in a case in which a determination to not perform the determination processing is made, updates, based on the service record of all users included in the acquired service record, the user record.

7. A collection method comprising:

by a computer, that is a collection device that collects information of a user of a plurality of services and stores the collected information in a user database, acquiring, from a service database related to a service to be processed, a service record storing the information of the user of each of the plurality of services;

updating, based on the acquired service record related to the service to be processed, a user record that is stored in the user database and in which information derived from the service record of each of the plurality of services is stored for every user, comprising adding, to a command queue, an update command for updating, based on the acquired service record, the user record for every user; and wherein updating the user record comprises, for only user records having an associated update command in the command queue, editing content of the user record, and storing the updated user record in the user database; and upon starting of the updating the user record, aggregating a remaining work amount of the updating of services, among the plurality of services, for which the updating has already started but has not ended, and in the updating based on the service record related to the service to be processed, determining, in accordance with the aggregated remaining work amount, whether to perform determination processing for determining, for every user, whether updating for the user record is necessary and skipping the updating of a user for which updating is determined to be unnecessary.

8. A non-transitory computer-readable recording medium storing a program for causing a computer, that is a collection device that collects information of a user of a plurality of services and stores the collected information in a user database, to execute processing of:

acquiring, from a service database related to a service to be processed, a service record storing the information of the user of each of the plurality of services;

updating, based on the acquired service record related to the service to be processed, a user record that is stored in the user database and in which information derived from the service record of each of the plurality of services is stored for every user, wherein starting the updating processing comprises adding, to a command queue, an update command for updating, based on the acquired service record, the user record for every user; and wherein updating the user record comprises, for only user records having an associated update command in the command queue, editing content of the user record, and storing the updated user record in the user database; and upon starting of updating processing for updating the user record, aggregating a remaining work amount of the updating processing of services, among the plurality of services, for which the updating processing has already started but has not ended, and in the updating processing based on the service record related to the service to be processed, determining, in accordance with the aggregated remaining work amount, whether to perform determination processing for determining, for every user, whether updating for the user record is necessary and skipping the updating processing of a user for which updating is determined to be unnecessary.

* * * * *